May 17, 1949.    D. D. BRODIE    2,470,427
ELECTRICAL SCALE
Filed Aug. 30, 1946    2 Sheets-Sheet 1
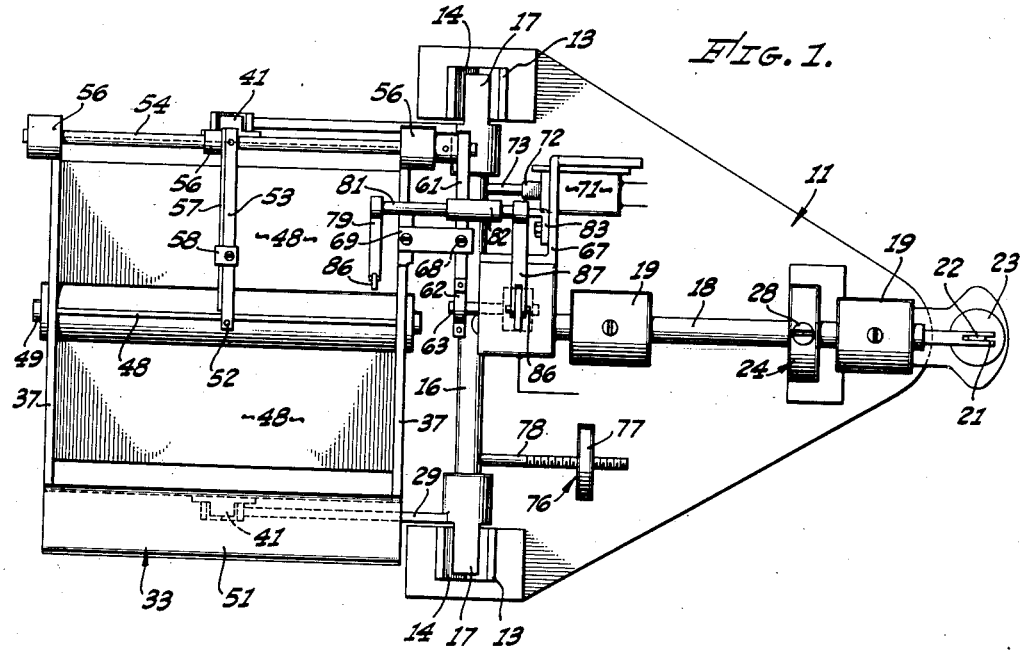
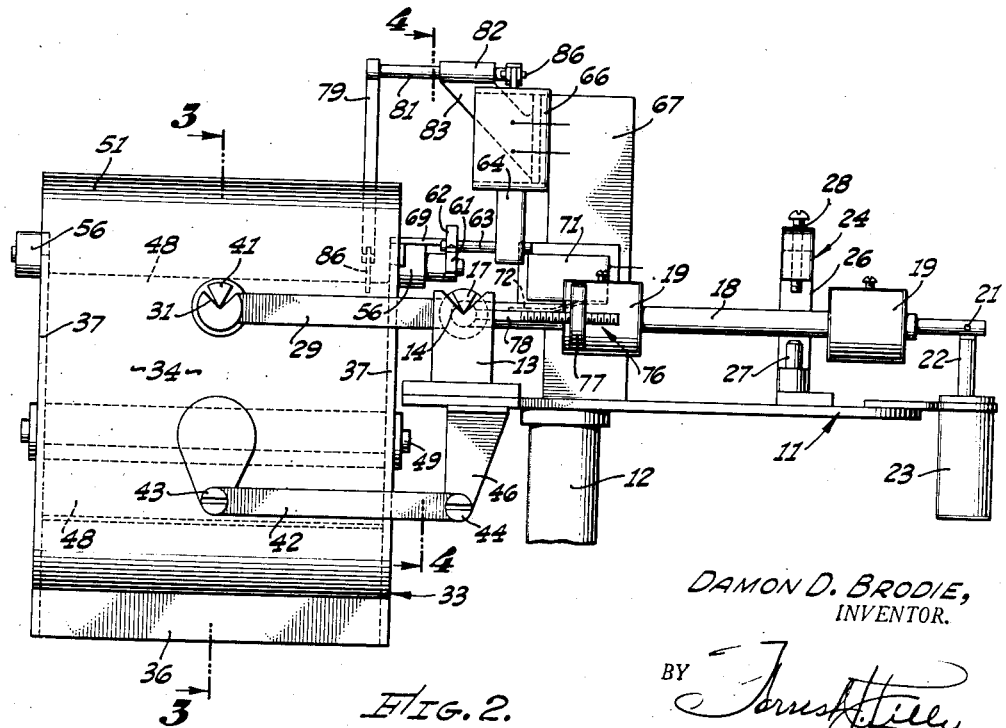
DAMON D. BRODIE,
INVENTOR.
BY *[signature]*
ATTORNEY.

May 17, 1949.   D. D. BRODIE   2,470,427
ELECTRICAL SCALE
Filed Aug. 30, 1946                           2 Sheets-Sheet 2
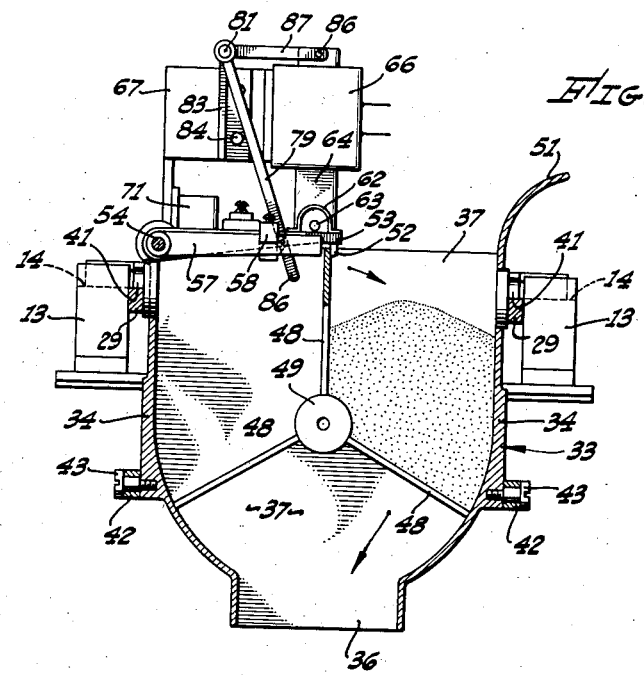
FIG. 3.
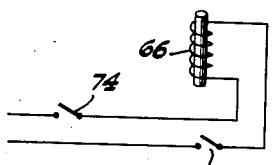
FIG. 7.
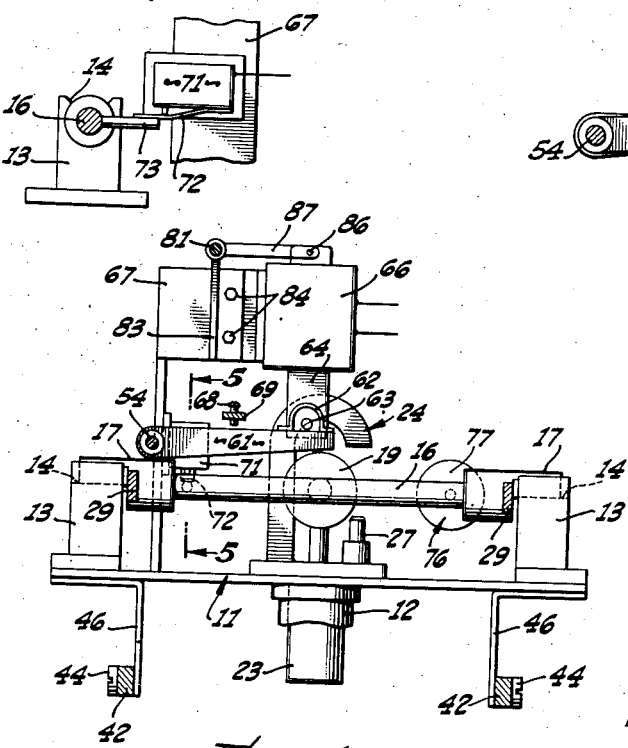
FIG. 5.
FIG. 4.
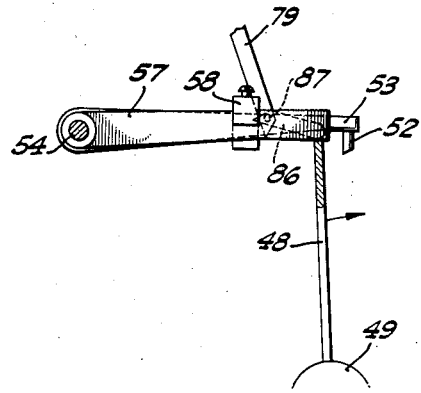
FIG. 6.
DAMON D. BRODIE,
INVENTOR.
BY
ATTORNEY.

Patented May 17, 1949

2,470,427

UNITED STATES PATENT OFFICE 2,470,427

ELECTRICAL SCALE

Damon D. Brodie, Los Angeles, Calif.

Application August 30, 1946, Serial No. 694,114

1 Claim. (Cl. 249—19)

The present invention relates to scales in general and more particularly to scales designed to weigh out predetermined quantities of bulk material such as dried fruits, peanuts, etc. from a continuously flowing source. More specifically, the invention comprises an improved scale in which a continuous flow of bulk material is automatically separated into batches or quantities of predetermined weight which are emptied into waiting containers.

In packaging many products such as dried fruits, peanuts, grain, flour, etc., it is extremely desirable and important that each package contain a predetermined weight. These goods are sold in stores and over the counter for a certain price and variations in the quantity contained in a package must fall within close limits or possibly violate the rights of the purchaser and in many instances, the local ordnances or statutes covering weights and measures. Additionally, and from the standpoint of the seller and packager, it is important that the quantity placed in each package be accurate and not in excess of a reasonable tolerance for clearly a repeated excess even though very small becomes aggravated into an appreciable error in time and after many repetitions.

It is also important that the goods should be weighed and separated rapidly. In an early method material was weighed into a pan against a balance weight and when the two arms of the scale were in balance, the source of the material was cut off and the contents removed from the pan into a container or bag. The method, which was often carried on manually, obviously involved the loss of the time required to start and stop the flow of material and to remove and replace the scale pan. In later improvements in which the material was automatically dumped from the pan and the source of the material was cut off when the predetermined weight had been placed upon the scale, again loss of time was incurred in the starting and stopping of the material flow. In the improved design represented by the present invention, the material to be weighed flows in an even, steady and continuous stream onto the scale and is automatically divided into batches which are automatically dumped into a waiting receptacle when they have attained the predetermined weight. That weight is variable by scale adjustment and a wide range of material can be weighed by the apparatus, excessively larger volumes and weights merely requiring larger units.

It is accordingly one specific object of the invention to provide a separating and weighing scale for bulk material which is characterized by its speed of operation and its accuracy of measurement.

It is another object of the invention to provide an automatically separating and measuring scale for bulk material which is simple in its construction and free from variations in operating characteristics in the handling of different types of material.

These and other objects and features of the invention will appear upon consideration of the following detailed description and appended drawings, both of which disclose a preferred embodiment of the invention.

Referring now to the drawings:

Figure 1 is a top plan view of a scale constructed in accordance with the present invention;

Figure 2 is a side elevation of the unit shown in Figure 1;

Figure 3 is a vertical transverse section upon the line 3—3 of Figure 2 and discloses the material-receiving bucket and the rotatable vanes positioned therein;

Figure 4 is a view looking in the direction of the arrows upon the line 4—4 of Figure 2 and shows the knife edge supports of the scale and the solenoid which releases the bucket vanes;

Figure 5 is a partial view looking in the direction of the arrows upon the line 5—5 of Figure 4 and shows the solenoid-controlling microswitch;

Figure 6 is a view of a bucket vane immediately prior to moving into locked position; and Figure 7 is a diagrammatic showing of the electrical circuit of the scale.

In the preferred embodiment of the invention illustrated in the drawing, the reference character 11 indicates a platform fixedly and rigidly mounted upon the top of a post 12. Platform 11 may well be triangularly shaped, as is seen from a consideration of Figure 1, and positioned at two corners thereof are supports 13, formed with a V-notch 14 in their upper surfaces.

An arm 16 extends across the top of platform 11 and is provided at its ends with knife edge supports 17 which seat within the V-notches 14 of supports 13. Arm 16 forms the pivotal axis of a pivoted scale frame and the knife edge supports provide a friction-free bearing therefor.

A weight beam 18, forming one side of the pivoted scale frame, extends centrally from arm 16 across the top of platform 11 and adjustably carries adjustable counterbalance weights 19 in the usual and well known manner. At its extreme outer end, beam 18 pivotally connects by a pin and slot arrangement, indicated at 21, with the upper end of a plunger 22 forming a part of a motion-retarding dashpot 23 carried by and extending below platform 11. The adjustment of the weights 19 upon the beam 18 determines the weight setting of the scale and the presence of the dashpot 23 connected thereto prevents unduly accelerated motion and jiggling in both directions of beam travel. The beam 18 is limited in its vertical movement by means of a limit stop, indicated generally at 24, which includes a bracket 26 secured to the upper face of platform 11, an underlying stop pin 27 positioned below the beam to limit its downward movement, and an adjustable screw stop 28 positioned above the beam to determine its limit of upward movement.

Yoke arms 29, forming the outer side of the pivoted scale frame, extend laterally from the ends of scale pivotal arm 16 at points closely adjacent the knife edges 17 and are provided at their outer ends with V-notches 31 in their upper sides similar to the V-notches 14 in the supports 13. Between the spaced arms 29 is positioned the material-receiving bucket indicated generally at 33, the vertical side walls 34 of which lie on a cylindric section near their lower extremities and then extend downwardly to form a discharge opening or port 36. The end walls 37 of the bucket are flat surfaced and extend vertically in parallel relationship, the inner wall being spaced laterally from the adjacent end of supporting platform 11. The bucket is directly supported upon the scale yoke arms 29 by knife edges 41 which extend from the side walls 34 near the upper edges thereof to provide a transverse pivotal mounting for the bucket. Levers 42 upon opposite sides of bucket 33 pass between pivot pins 43 on the bucket sides directly below the knife edges 41, and pins 44 carried by downwardly extending brackets 46 on the underside of platform 11 directly below knife edges 17. The levers insure that in the vertical movement of the bucket as the scale frame 16, 18, 29 is pivoted the bucket will maintain a strictly vertical position. This is necessarily true for the levers 42 are of the same length as the yoke arms 29 and the pivot pins 43 and 44, at its opposite ends, are positioned vertically below the pivotal knife edges 17 and 41. This relationship is important for, were the bucket to be permitted to tilt as it changed its vertical height, the free flow of material therethrough would be affected.

Within bucket 33 is positioned a vane structure comprising a plurality, preferably three, of vanes 48 extended radially from a central solid spindle 49 rotatably mounted in the end walls 37 of the bucket by suitable pin-type bearings which are not shown. Vanes 48 are of such width that their sides move closely adjacent the bucket end walls 37 as the vanes rotate and their outer extremities move in close sealing adjacency to the curved lower cylindric portions of the bucket side walls 34. The vanes are angularly disposed, as is clearly illustrated in Figure 3, and when positioned with one vane extended vertically, form a pocket comprising two vanes, the front wall 34 and the end walls 37, which is adapted to receive fluent bulk material poured into the bucket over its forward lip 51 at the top of side wall 34.

To hold the vanes in pocket-forming and material-receiving position during the weighing operation, front and rear stops are provided which cooperate with the vertical vane. The front stop comprises a stop pin 52 fixedly carried in the center of the bucket by a transverse arm 53, the outer end of which is fixedly secured to a shaft 54 rotatably mounted in spaced bosses or bearings 56 positioned along the upper edge of the bucket rear wall 34. Front stop or pin 52 is positioned in substantially the longitudinal center of the vanes so that the restraining force which it exerts upon the vertically extended vane 48 is equidistant from the mountings of the vane structure in the end walls 37 for the purpose of preventing and eliminating any twisting or binding action. Front stop 52 is positioned upon the forward or advancing side of the vertical vane 48 and is incapable of preventing rotation of the vane structure in the opposite direction. Cooperating therewith to prevent rearward travel of the vane structure once it is stopped in its forward travel is a latch arm 57, known as the rear stop, which is mounted for free pivotal movement upon the shaft 54 within limits permitted by its adjustable U-bracket limit stop 58 on transverse arm 53. The under-surface of latch arm 57 is so contoured and positioned that as a vane 48 advances to contact front stop pin 52 it cams the end of the latch arm 57 upwardly until it has passed thereunder. Immediately the vane has passed it the arm, under the influence of gravity, falls in behind the vane. The latter is then positioned between the front stop pin 52 and the rear stop 57 and is held in its vertical position.

With fluent bulk material poured continuously into the material-receiving pocket in the bucket, means are essential to release the rotatable vane structure to permit dumping through the discharge port 36 when the predetermined amount of material has been weighed out. The mechanics of the release at the bucket comprises the lifting of the stop pin 52 by the pivotal arm 53, immediately resulting in the rotation of the vanes 48 under the weight of the contained material. To transmit a lifting force to the arm 53 the shaft 54 to which the arm is connected is extended beyond its inner bearing 56 and secured thereto is an actuating arm 61 on the inner end of which is positioned a hoop bracket 62. Extended through hoop 62 and in spaced relation thereto is a pin 63 fixed to the lower end of armature 64 of a solenoid 66. The latter is held in its position above the actuating arm 61 with all of its parts out of contact with all movable parts of the scale by a rigid bracket 67 fixed to the top of platform 11. Energization of solenoid 66 causes the armature 64 thereof to move upwardly and the pin 63 to contact the top of hoop 62 and to lift the actuating arm 61 to its upper position as determined by the adjustable stop 68 positioned at the outer end of an arm 69 on the adjacent bucket end wall 37. The movement of actuating arm 61, of course, effects the rotation of shaft 54 and the lifting of stops 52 and 57 to release the vane structure.

To determine the instant for release of the vane structure a highly sensitive or micro-throw switch 71 is mounted upon bracket 67 with its operating lever 72 extended toward and relatively close to the scale frame arm 16. A rigid finger or pin 73 extends outwardly from arm 16 and under the switch lever 72, the relationship being such that the pivotal movement of the frame through a very small arc will be sufficient to move the switch lever 72 a fraction of an inch and close the switch. As is clearly shown diagrammatically in Figure 7, microswitch 71 is connected in series with the winding of solenoid 66 so that the closure of the micro-throw switch effects instantly the energization of the solenoid and the aforedescribed pivotal movement of actuating arm 61. Preferably in the circuit with the micro-throw switch 71 and the solenoid 66 is a manually operable switch 74 which is adapted to control the flow of current to the entire unit.

The operative structure of the scale constructed in accordance with the present invention may be completed by the presence of a vernier weight adjustment indicated generally at 76 which includes a rotatable weight 77 mounted upon a rigid threaded shaft 78 extended parallel to platform 11 from the scale arm 16. This vernier adjustment makes it possible more accurately to fix the exact weight which operates the device and in this it supplements the counterweights 19.

In the preferred embodiment of the invention, however, means are provided to accelerate certain operations. In particular the speed of vane movement is increased in the dumping operation effecting not only a faster scale performance but also greater accuracy in weighing through cutting off more quickly the flow of material into a pocket about to be dumped.

To accomplish this faster operation a kicker is provided, the function of which is to give an accelerating push, kick or shove to the vertical vane which has just been released by the stop pin 52. The kicker comprises a lever 79 fixed to a shaft 81 itself rotatably mounted in a bearing 82. The bearing is carried by a bracket 83 secured to the solenoid bracket 67 by screws 84 and is positioned above and at one side of solenoid 66 substantially in the plane of the projecting top of the armature 64. The latter carries a pin 86 to which is connected the bifurcated end of a second lever 87 fixed, in the manner of first lever 79 to the shaft 81. The upward movement of the armature 64 effects the concomitant pivotal movement of the shaft 81 and levers 79 and 87. The lower end of lever 79 extends slightly rearwardly of the vertical vane 48, as is shown most clearly in Figure 3, and the upward movement of the solenoid armature advances that end abruptly toward the vane. The relationship is such that pin 63 carried by the lower end of the armature has contacted and lifted hoop bracket 62, and with it the stop pin 52, just before the lever reaches the vane. As a result the lever strikes the vane just as it is getting under way and gives it a kick to accelerate its movement.

The following vane 48 must pass by kick lever 79 to reach its vertical position and to permit this the lower extremity of the lever is formed as a separately pivotable element or foot 86 connected to the main portion of lever 79 by a pivot pin 87 extended between the divided lower end thereof. The upper end of foot 86 is shaped to make contact with the main portion when the foot and the lever proper are in alinement, as shown in Figure 3, but the relationship permits the free pivotal movement of the foot relative to the lever proper in one direction, that is, in a direction which enables the proving vane 48 to move thereunder as is clearly shown in Figure 6.

The operation of the scale constructed in accordance with the present invention is as follows:

The entire unit is first positioned solidly and independently upon a surface above which it is held by the support 12 with the table 11 in a horizontal plane. A suitable unshown pedestal may seat the support 12, if desired, but in any event the mounting should be independent of the feeder and of the hopper into which the material is fed so as to be free of all outside vibrations. The counterweights 19 and the vernier adjustment weight 76 are positioned so that the scale will automatically dump its contents at the desired weight. The unit is then ready for operation, the manual switch 74 being closed, and the vanes within the bucket 33 are positioned as shown in Figure 3.

Fluent material flows evenly into the bucket and specifically into the pocket formed by the vertical and the forwardly and downwardly sloping vanes 48, by the front wall 34, and by the end walls 37. The presence of the curved lip 51 aids and assists the entrance of the foreign material and helps prevent spillage. As the weight of the accumulated material in the bucket increases, it slowly moves downward with the yoke arms 29 accompanied by the coordinate upward movement of the weight-carrying beam 18. This movement of the scale frame is gradual and in the entire absence of any jerking or jiggling action due to the presence of the dashpot 23 which connects to the beam. The downward movement of the bucket 33 is accomplished without tilting by virtue of the presence of the pivoted lever 42 which, with the yoke arms 29, provide a pantograph arrangement which insures this result.

When finally the predetermined weight of material has been poured into the bucket pocket, the bucket is lowered sufficiently that the pivotal movement of arm 16 acting through pin 73 moves the micro-throw switch lever 72 into closed position. Instantly the solenoid 66 is energized and its armature 64 travels upwardly so that the pin 63 carried thereby contacts the hoop 62 and lifts the actuating arm 61. The latter is fixedly connected to the shaft 54 and its rotation effects the pivotal movement of the transverse arm 53 carrying the front stop pin 52. The latter moves upwardly from in front of the vertical vane 48, accompanied incidentally by the rear stop 57, and the vane structure then rotates, under the weight of the collected material in the pocket, in a clockwise direction as viewed in Figure 3. The release of the vertical vane by the stop 52 is followed immediately, almost simultaneously in the preferred embodiment, by the push of the kicker 79 under the actuation of the solenoid as described. The device will operate satisfactorily in the absence of the kicker but its presence insures faster more accurate weighing. The vanes move under the forces of gravity and of the kicker until the filled pocket empties downwardly from the bucket through the discharge opening 36.

The discharge of the collected material immediately enables the counterweights 19 to overcome the weight of the bucket and to pivot the arm 16 sufficiently to effect the opening of the micro-throw switch 71. Thereupon the solenoid is deenergized and stop pin 52 with its carrying arm 53 moves back into its vane-holding position.

Immediately after the stop 52 has reached its operative position, the vane 48 approaching the vertical position brushes past the latch arm 57, camming it upwardly and out of the way, pivots the kicker foot 86 upwardly, as shown in Figure 6, to move into abutting contact with the front stop 52. Rear stop or latch arm 57 is so constructed and arranged that it instantly falls in behind the passing vane, which then finds itself locked in a vertical position, and the foot 86 returns under gravity actuation to its normal position.

This operation has taken place during the continuous flow of material into the bucket. Clearly some material will have entered the dumping pocket after the release of the vertical vane 48 and will have added its weight to the release weight at which the scale is set. The operation of the scale a few times initially to determine this excess weight permits of the adjustment of the vernier weight adjustment 76 to compensate for this so that in subsequent operations the bucket will be released for the dumping action at a time sufficiently prior to the attainment of the full desired weight that the weight of contents dumped will be exactly that which is desired.

While the particular apparatus herein shown and described in detail is fully capable of attaining the objects and providing the advantages hereinbefore stated, it is to be understood that it is merely illustrative of the presently preferred embodiment of my invention, and that I do not mean to limit myself to the details of construction or design herein shown, other than as defined in the appended claim.

I claim:

In a scale of the type designed to weigh and separate continuously flowing material into batches of a predetermined weight, a platform, a scale frame supported by spaced knife edges upon said platform and including a pair of spaced arms extended at one side of said platform and a beam extended thereover, counterbalancing weights on said beam, a bucket open at its top and formed with a discharge port, knife edges supporting said bucket for pivotal movement on said arms and a lever pivotally secured to said bucket below the supporting knife edges thereof, pivotally connected to a point fixed with respect to said platform, and positioned below the knife edges thereon, said lever functioning to maintain said bucket in a vertical position throughout its pivotal movement.

DAMON D. BRODIE.

REFERENCES CITED

The following references are of record in the file of this patent:

UNITED STATES PATENTS

| Number | Name | Date |
|---|---|---|
| 618,129 | Outcalt et al. | Jan. 24, 1899 |
| 727,302 | Danne | May 5, 1903 |
| 1,082,354 | Mulloy | Dec. 23, 1913 |
| 1,222,913 | Williams | Apr. 17, 1917 |
| 2,041,629 | Wicks | May 19, 1936 |
| 2,119,106 | Johnson | May 31, 1938 |
| 2,299,636 | Mansbendel | Oct. 20, 1942 |
| 2,436,983 | Vredenburg | Mar. 2, 1948 |